(12) United States Patent
Landry

(10) Patent No.: US 11,584,522 B2
(45) Date of Patent: Feb. 21, 2023

(54) ROTORCRAFT WITH COOLING ANTI-TORQUE SYSTEM

(71) Applicant: Bell Textron Inc., Fort Worth, TX (US)

(72) Inventor: Martin Landry, Prevost (CA)

(73) Assignee: Textron Innovations Inc., Providence, RI (US)

( * ) Notice: Subject to any disclaimer, the term of this patent is extended or adjusted under 35 U.S.C. 154(b) by 291 days.

(21) Appl. No.: 17/106,514

(22) Filed: Nov. 30, 2020

(65) Prior Publication Data

US 2022/0169374 A1  Jun. 2, 2022

(51) Int. Cl.
| | | |
|---|---|---|
| B64C 27/82 | (2006.01) | |
| B64C 27/06 | (2006.01) | |
| B64C 5/06 | (2006.01) | |
| B64D 27/02 | (2006.01) | |
| B64D 33/08 | (2006.01) | |
| B64D 33/04 | (2006.01) | |
| B64C 9/00 | (2006.01) | |

(52) U.S. Cl.
CPC ............ B64C 27/82 (2013.01); B64C 5/06 (2013.01); B64C 9/00 (2013.01); B64C 27/06 (2013.01); B64D 27/02 (2013.01); B64D 33/04 (2013.01); B64D 33/08 (2013.01); B64C 2027/8272 (2013.01)

(58) Field of Classification Search
CPC .. B64C 5/06; B64C 9/00; B64C 27/06; B64C 27/82; B64C 2027/8272; B64D 27/02; B64D 33/04; B64D 33/08
USPC ...................................................... 244/17.19
See application file for complete search history.

(56) References Cited

U.S. PATENT DOCUMENTS

| | | | | |
|---|---|---|---|---|
| 3,957,226 A | * | 5/1976 | Daggett, Jr. ............ | B64C 27/82 244/17.19 |
| 4,660,785 A | * | 4/1987 | Munski ................... | B64C 27/82 244/17.19 |
| 4,948,068 A | * | 8/1990 | VanHorn ................. | B64C 27/82 244/17.19 |
| 5,240,205 A | * | 8/1993 | Allongue ................ | B64C 27/82 244/17.19 |
| 5,649,678 A | * | 7/1997 | Nurick .................... | B64C 27/82 244/17.19 |
| 6,416,015 B1 | * | 7/2002 | Carson .................... | B64C 27/82 244/17.19 |
| 7,731,121 B2 | * | 6/2010 | Smith ...................... | B64C 27/82 244/17.19 |
| 8,561,938 B2 | | 10/2013 | Dickman | |
| 8,960,599 B2 | * | 2/2015 | Edwards ................. | B64C 15/00 244/55 |
| 2012/0187237 A1 | * | 7/2012 | Dickman ................ | B64C 27/82 244/17.19 |
| 2012/0318910 A1 | | 12/2012 | Smith | |

(Continued)

FOREIGN PATENT DOCUMENTS

GB          2238996 A  *  6/1991  ............ B64C 27/26

*Primary Examiner* — Brady W Frazier
(74) *Attorney, Agent, or Firm* — Shackelford, Bowen, Mckinley & Norton, LLP

(57) ABSTRACT

An exemplary anti-torque system for a rotorcraft includes a fan located inside of a channel that extends inside of a fuselage from an inlet proximate a forward end of the tail boom to an outlet at an aft end of the tail boom, the outlet is oriented to direct airflow from the channel onto a rudder coupled to a trailing edge of a vertical stabilizer.

20 Claims, 10 Drawing Sheets

(56) References Cited

U.S. PATENT DOCUMENTS

| | | |
|---|---|---|
| 2013/0087653 A1 | 4/2013 | Brand et al. |
| 2014/0090820 A1* | 4/2014 | Pisani .................... B64C 27/12 |
| | | 165/121 |
| 2018/0273167 A1 | 9/2018 | Carr et al. |
| 2020/0198781 A1 | 6/2020 | Haldeman et al. |

* cited by examiner

ROTORCRAFT WITH COOLING ANTI-TORQUE SYSTEM

TECHNICAL FIELD

This disclosure relates in general to the field of aircraft, and more particularly, but not by way of limitation, to rotorcraft anti-torque and directional control.

BACKGROUND

This section provides background information to facilitate a better understanding of the various aspects of the disclosure. It should be understood that the statements in this section of this document are to be read in this light, and not as admissions of prior art.

Rotorcraft require some form of anti-torque and direction control in order to counteract the torque effect of the main rotor and to control the direction of the rotorcraft. In some cases, a rotorcraft may include a tail rotor, Fenestron or NOTAR (No Tail Rotor) system.

SUMMARY

An exemplary anti-torque system for a rotorcraft includes a fan located inside of a channel that extends inside of a fuselage from an inlet proximate a forward end of the tail boom to an outlet at an aft end of the tail boom, the outlet is oriented to direct airflow from the channel onto a rudder coupled to a trailing edge of a vertical stabilizer.

An exemplary rotorcraft includes a fuselage having a body and a tail boom, a main rotor located with the body, a vertical stabilizer at an aft end of the tail boom, a rudder coupled to a trailing edge of the vertical stabilizer, a channel inside of the fuselage extending from an inlet proximate a forward end of the tail boom to an outlet proximate the aft end, the outlet oriented to direct airflow from the channel onto the rudder and a fan located inside of the channel aft of the inlet.

Another exemplary rotorcraft includes a fuselage having a body and a tail boom, a main rotor located with the body, a vertical stabilizer at an aft end of the tail boom, a rudder coupled to a trailing edge of the vertical stabilizer, a channel inside of the fuselage extending from an inlet proximate a forward end of the tail boom to an outlet on the trailing edge of the stabilizer, the outlet is oriented to direct airflow from the channel onto the rudder, a diffuser operable to vertically distribute the airflow through the outlet, a fan located inside of the channel aft of the inlet, a divider positioned vertically in tail boom dividing the channel into generally symmetric first and second outlet portions, and a vane operable between a forward-thrust position in which the vane permits the airflow to be directed onto the rudder through the first outlet portion and the second outlet portion and a reverse-thrust position in which the vane blocks the airflow through the first outlet portion onto the rudder opens a reverse port on the tail boom in communication with the first outlet portion.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
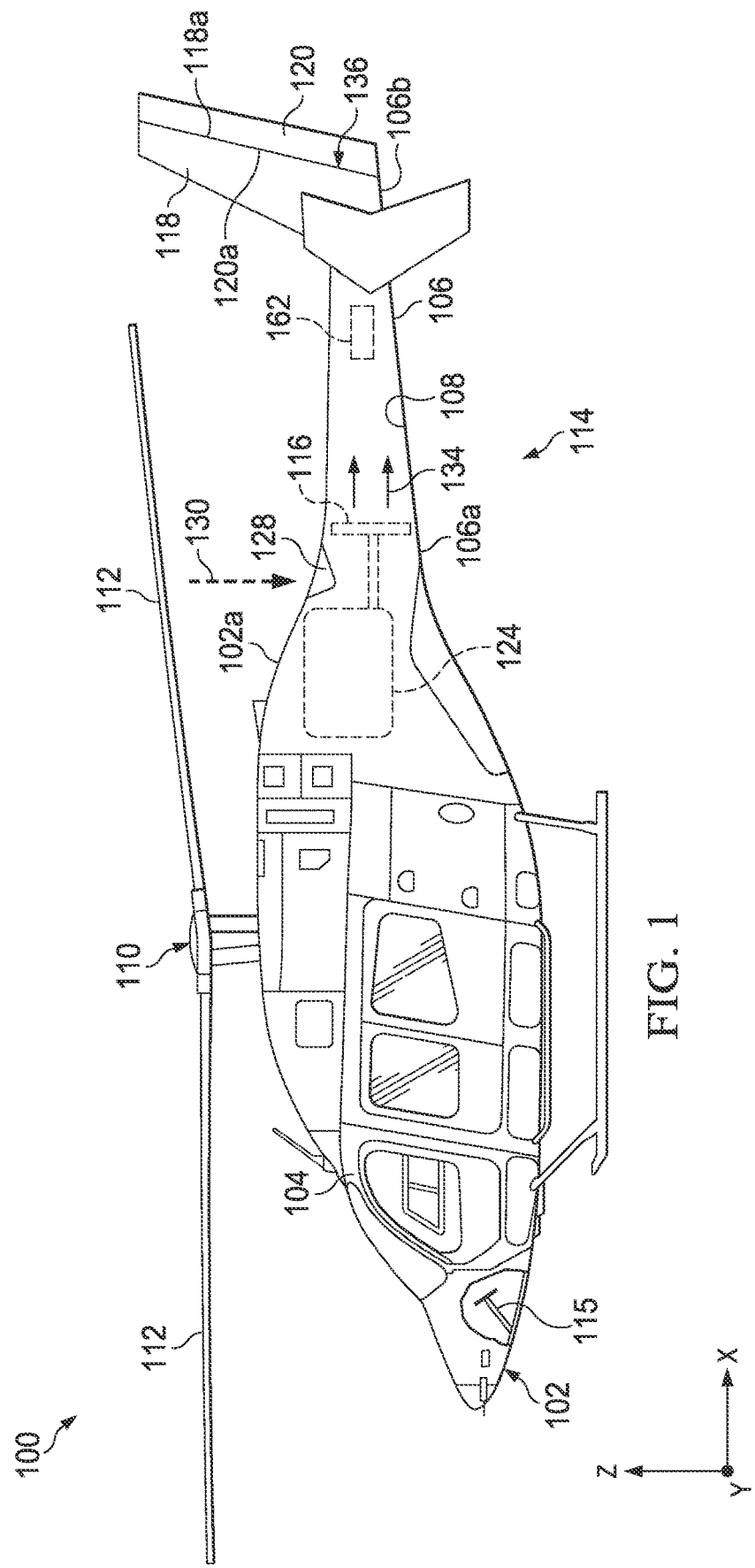
FIG. 1 illustrates an exemplary rotorcraft incorporating an exemplary anti-torque system.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fever features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 depicts three mutually orthogonal directions X, Y, and Z forming a three-dimensional frame of reference XYZ. Longitudinal axis X corresponds to the roll axis that extends through the center of rotorcraft 100 in the forward and aft directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

FIG. 1 illustrates an exemplary rotorcraft 100 comprising a fuselage 102 having a body 104 and a tail boom 106. Tail boom 106 has an internal passage or channel 108 extending frons a forward end 106a at fuselage body 104 to an aft end 106b. A main rotor 110 with a plurality of rotor blades 112 is located with body 104 and generally rotates about the vertical axis Z. Anti-torque system 114 is incorporated with tail boom 106 to provide thrust to counter the torque due to the rotation of main rotor 110 and allows a pilot to control the yaw of rotorcraft 100. During flight, a pilot can manipulate controls, illustrated by pedals 115, to provide flight movement, including yaw control. Anti-torque system 114 does not include a tail rotor positioned at the aft end 106b the tail boom thereby reducing weight of the rotorcraft and eliminating hazards of tail rotors. In some embodiments, anti-torque system 114 is configured to cool the engine, in particular when an internal combustion engine is utilized, and to combine cooling and anti-torque functionality into the same system.

Figure 3:
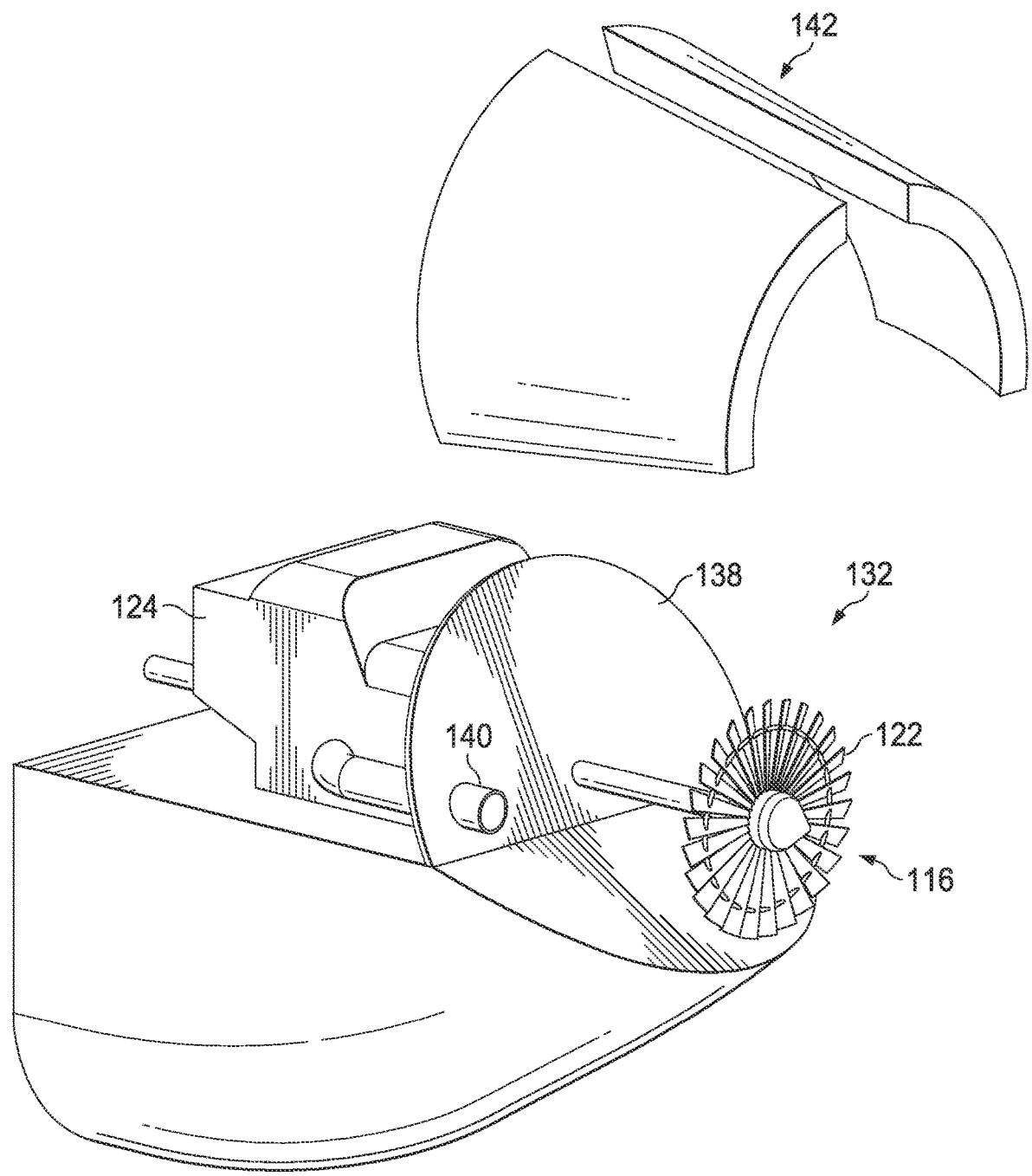
FIG. 3 is a cut-away view of a rotorcraft illustrating features of an exemplary anti-torque system.

With reference to all of the figures, anti-torque system 114 includes a fan 116 located inside of channel 108 proximate forward end 106a, a vertical stabilizer 118 at tail boom aft end 106b, and a controllable rudder 120. Rudder leading edge 120a is coupled at a stabilizer trailing edge 118a along an interface that is generally in the same plane, X-Z plane, as the yaw-axis Z. Fan 116 is driven by a prime mover 124, such as an internal combustion engine (ICE) turbine, electric motor, or a hydraulic motor. In an exemplary embodiment, prime mover 124 is an internal combustion engine that is located inside of body 104 and is coupled by a driveshaft 126 to fan 116. Fan 116 may have fixed or variable pitch blades 122 (FIG. 3). In some embodiments, prime mover 124 is also coupled to main rotor 110 to rotate blades 112. An inlet 128 to channel 108 is formed along a top fuselage surface 102a, proximate tail boom forward end 106a. Inlet 128 is positioned between prime mover 124 and fan 116 to introduce outside air 130 into a low-pressure zone 132. Main rotor 110 pushes cold outside air 130 as rotor-wake into inlet 128 and fan 116 creates a low-pressure zone below inlet 128. Outside air 130 mixes with hot air and exhaust from prime mover 124 and the airflow 134 is pushed through channel 108 in the aft direction and exhausted through an outlet 136 onto rudder 120. Outlet 136 may be located at stabilizer trailing edge 118a. Outlet 136 may be a vertical opening along stabilizer trailing edge 118a and extending substantially along the length of rudder leading edge 120a. The vertical outlet 136 may comprise a plurality of openings to direct airflow 134 substantially along the length of rudder leading edge 120a. Rudder 120 is controllable for yaw-control.

Figure 2:
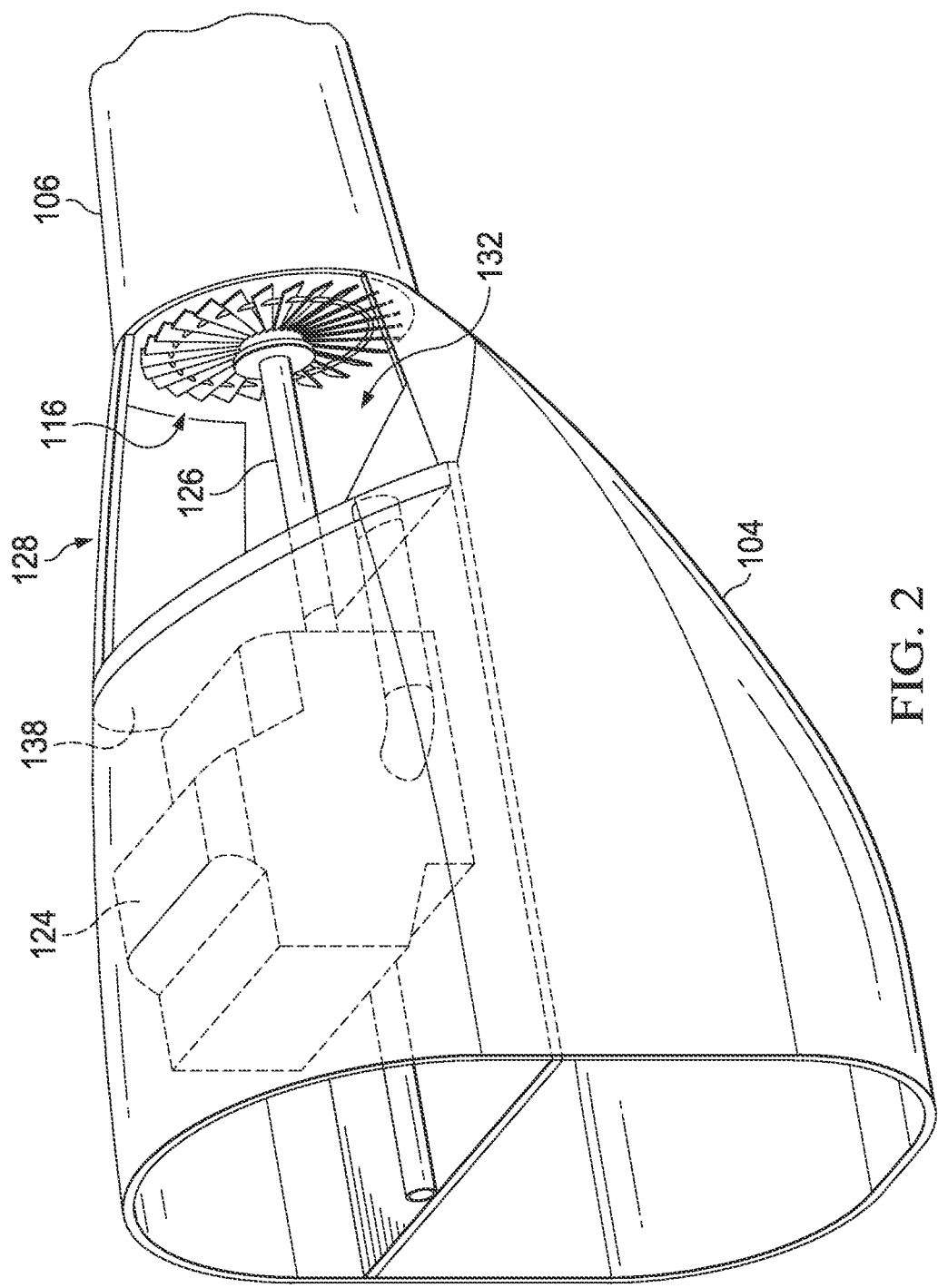
FIG. 2 is a cut-away view of a rotorcraft illustrating a portion of an exemplary anti-torque system.

With reference in particular to FIGS. 2 and 3, a low-pressure zone 132 is formed inside the fuselage between fan 116 and a firewall 138 positioned aft of prime mover 124. An exhaust conduit 140, in the case of an internal combustion engine 124, extends from engine 124 through firewall 138 into low-pressure zone 132. The exhaust and rotor-wake air 130 mix in low-pressure zone 132 are pass as airflow 134 through channel 108. In some embodiments, one or more heat exchangers 142 are positioned, for example in inlet 128, so that cool rotor-wake air 130 passes through the heat exchanger. Heat exchanger 142 may be coupled with internal combustion engine 124 for cooling. For example, heat exchanger 142 may be a radiator to liquid cool internal combustion engine 124.

Figure 4:
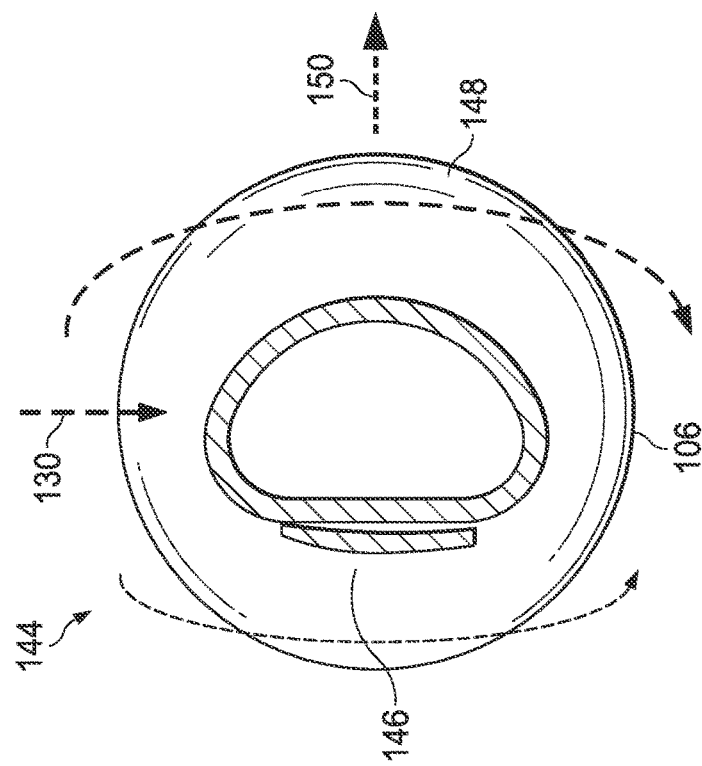
FIG. 4 illustrates a tail boom with a D-shaped portion according to aspects of an exemplary anti-torque system.

With reference in particular to FIG. 4, tail boom 106 may have a generally D-shape portion 144 to create an anti-torque force 150. D-shaped portion 144 has a generally vertical planar side 146 and an opposite convex side 148 to create anti-torque force 150 in the direction from the generally planar side 146 to convex side 148 in response to the rotor downwash represented by arrow 130. Tail boom 106 starts at the forward end as a circle to dispose fan 116 and transitions into a D-shape at the aft end. The tail boom may include slots on the lower, convex side to enhance the Coanda effect. FIG. 4 illustrates anti-torque force 150 acting in the starboard direction, however, tail boom 106 may be configured to create the anti-torque force in the port direction depending on the direction of rotation of the main rotor.

Figure 5:
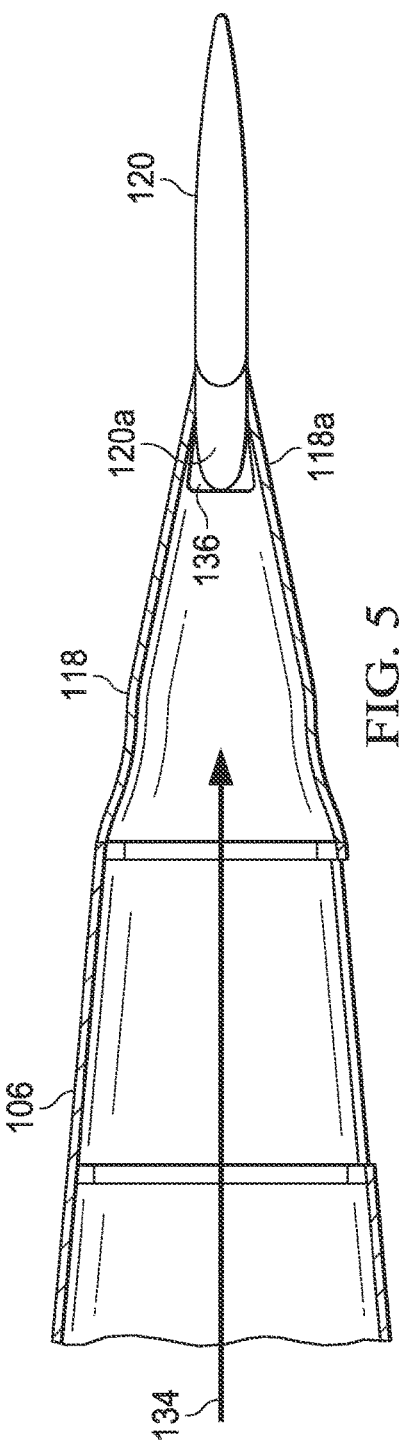
FIG. 5 is a cut-away view illustrating airflow inside of a tail boom according to aspects of an exemplary anti-torque system.

FIG. 5 is a top view illustrating an exemplary airflow outlet 136. Outlet 136 is formed at stabilizer trailing edge 118a and directed at rudder leading edge 120a creating a blown rudder. Outlet 136 may comprise one or more openings. In some embodiments, outlet 136 is configured to direct airflow 134 along the vertical length of rudder leading edge 120a.

Figure 6:
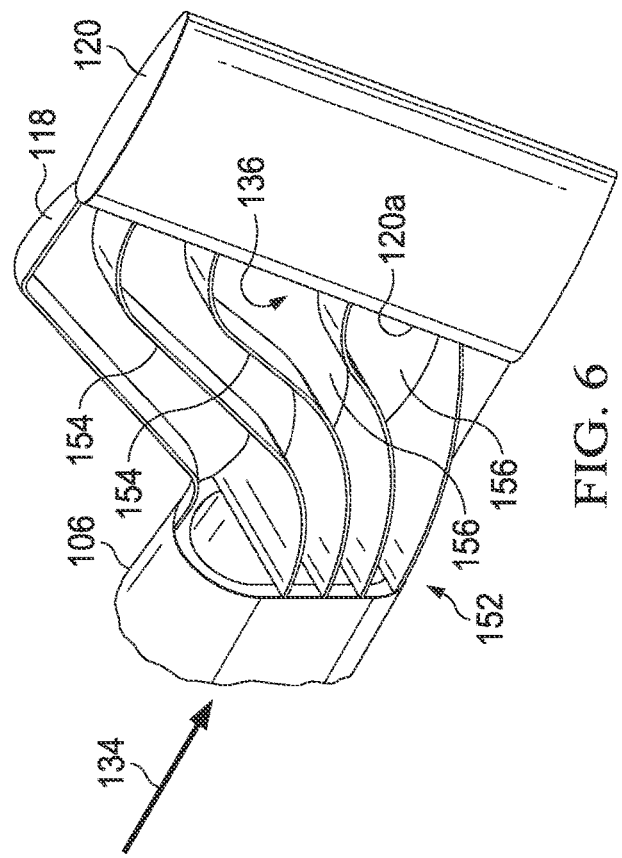
FIG. 6 illustrates an exemplary outlet diffuser according to aspects of an exemplary anti-torque system.

FIG. 6 illustrates an exemplary vertical stabilizer 118 incorporating a diffuser 152. Diffuser 152 includes two or more vertically separated structures 154 creating multiple passages 156 leading to outlet 136. Diffuser 152 directs airflow 134 through outlet 136 generally along the length of rudder leading edge 120a.

Airflow 134 blown onto rudder 120 creates a responsive yaw system, but also creates a push force that is not desired in hover flight. Some embodiments include a reverser vane to counter this push force. FIGS. 7A-7D illustrate a reverser vane in a hover flight or reverse-thrust position and FIGS. 8A-8D illustrate a reverser vane in a forward flight or forward-thrust position.

An exemplary reverser vane assembly 158 includes a divider wall 160 arranged in tail boom 106 vertically dividing the aft portion of channel 108 and outlet 136 into a first outlet portion 136a and a second outlet portion 136b. Divider 160 extends for example in the same plane (X-Z plane) as yaw axis Z so first and second outlet portions 136a, 136b are symmetric and airflow 134 is divided into first and second airflow streams 134a, 134b in the respective outlet portions 136a, 136b. First outlet portion 136a is directed to the first side 168 of rudder 120 and second outlet portion 136b is directed to the second side 170 of rudder 120. A vane 162 is coupled to wall 160 and moveable between the reverse-thrust position (FIGS. 7A-7D) and the forward-thrust position (FIGS. 8A-8D). In the illustrated embodiments, first side 168 is the port side and second side 170 is the starboard side only for the purpose of illustration.

With reference in particular to FIGS. 7A-7D, anti-torque system 114 is illustrated for slow flight or hover. With additional reference to FIGS. 1-6, in slow or hover flight, reverser vane 162 is in the reverse-thrust position. Vane 162 may be a proportional speed activated vane that diverts airflow 134 to the side of rudder 120 where force 150 is needed to counter the main rotor torque. To balance forward and aft forces, vane 162 acts as a reverser on the opposite side, which adds to anti-torque force 150. Yaw may be controlled by the pressure in tail boom 106 and by deflecting rudder 120. Pilot controls, e.g., pedals, may control both the pitch of fan 116 for pressure control and the deflection of rudder 120.

Figure 7A:
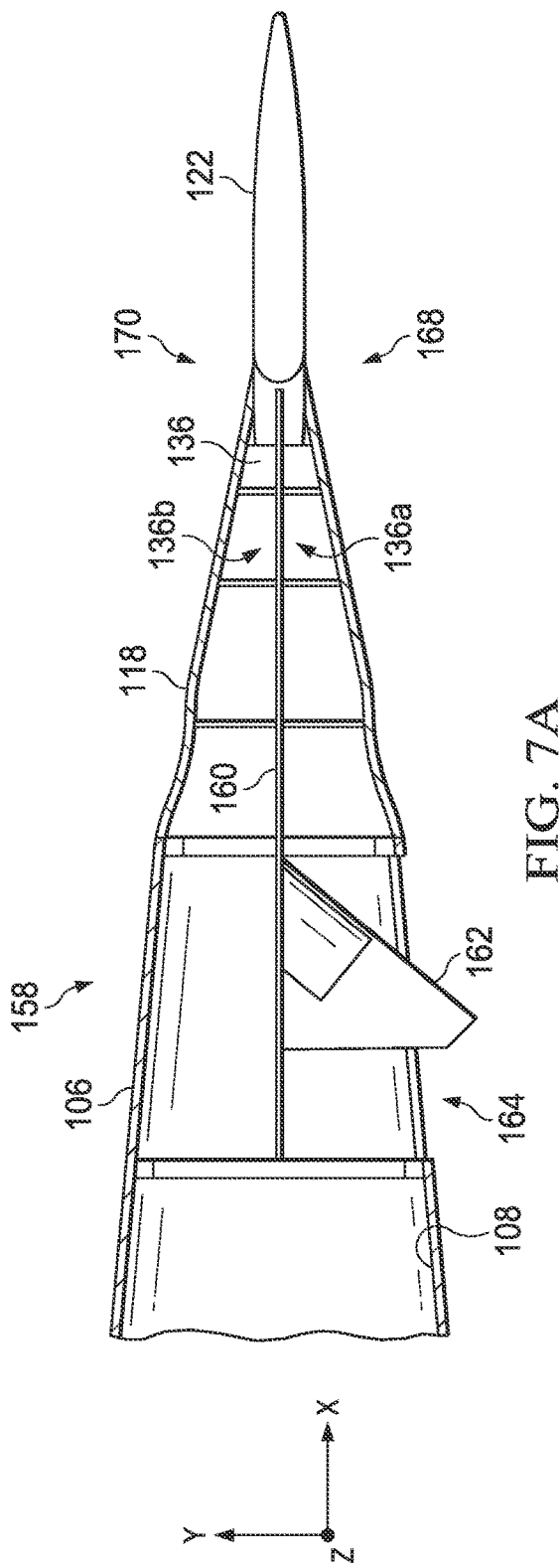
FIG. 7A is a cut-away top view illustrating a reverser vane assembly according to aspects of an exemplary anti-torque system in a reverse-thrust position.
Figure 7B:
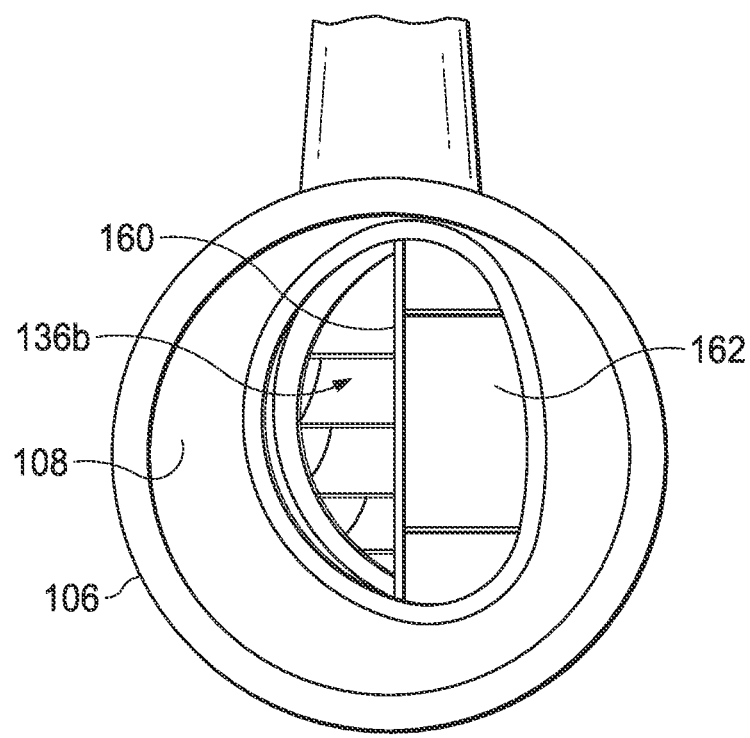
FIG. 7B is a cut-away end vie illustrating a reverser vane assembly according to aspects of an exemplary anti-torque system in a reverse-thrust position.
Figure 7C:
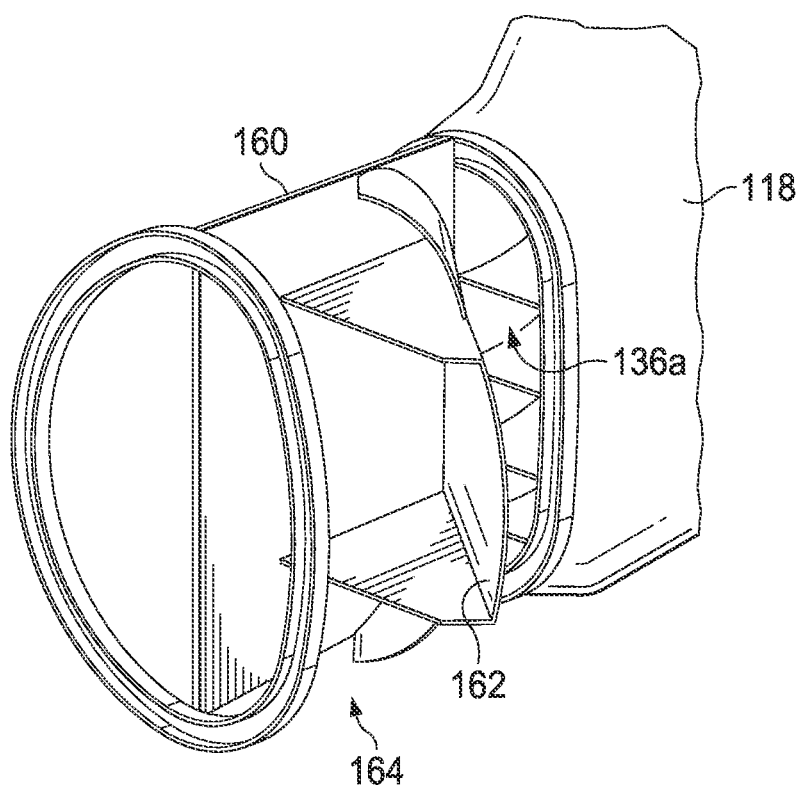
FIG. 7C is a cut-away perspective view illustrating a reverser vane assembly according aspects of an exemplary anti-torque system in a reverse-thrust position.
Figure 7D:
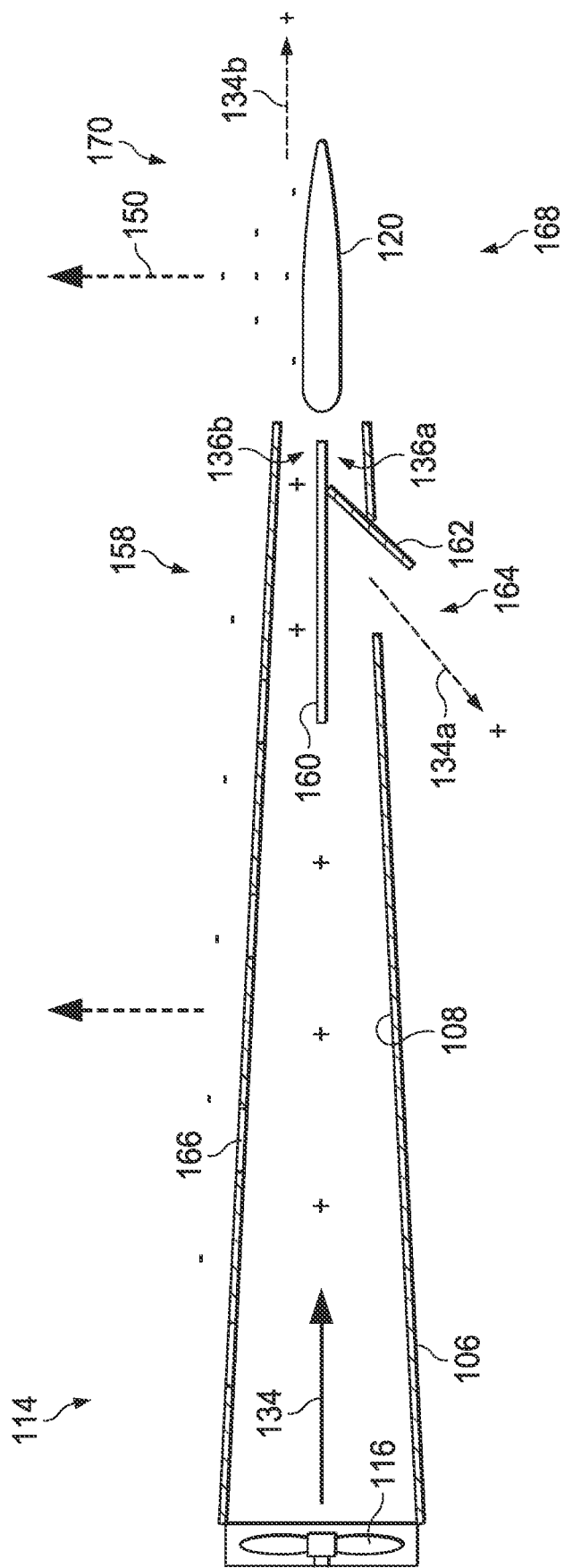
FIG. 7D is a schematic illustration of operation of an exemplary anti-torque system in a reverse-thrust position.
Figure 8A:
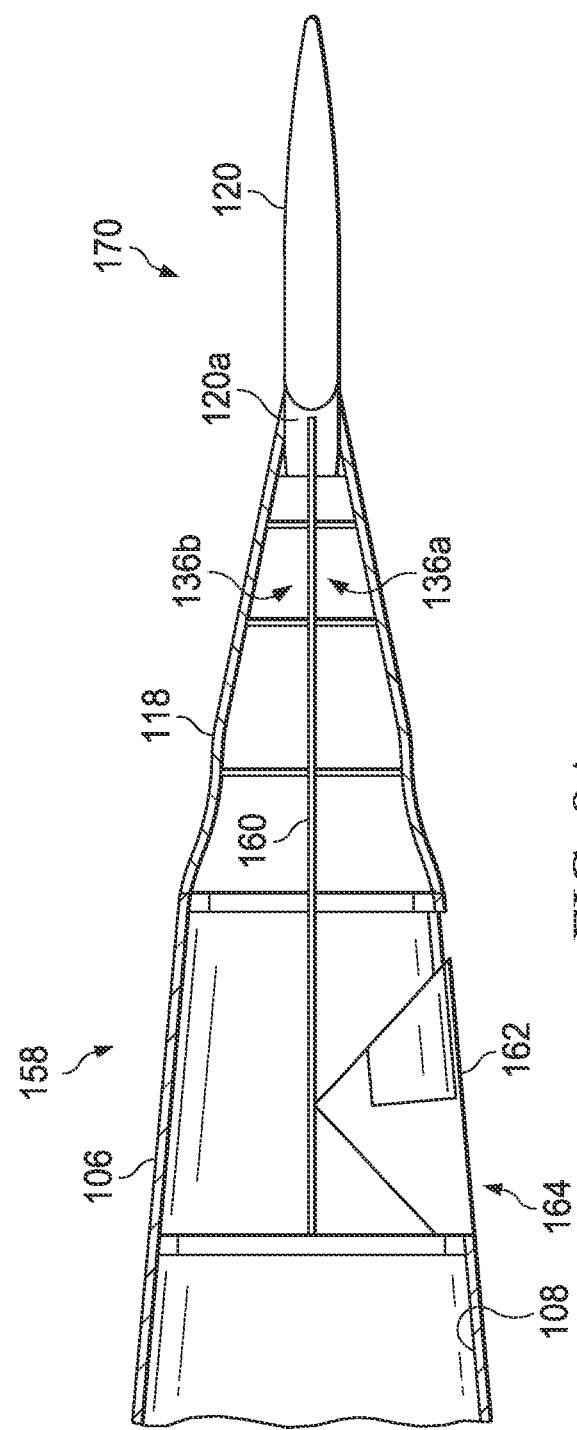
FIG. 8A is a cut-away top view illustrating a reverser vane assembly according to aspects of an exemplary anti-torque system in a forward-thrust position.
Figure 8B:
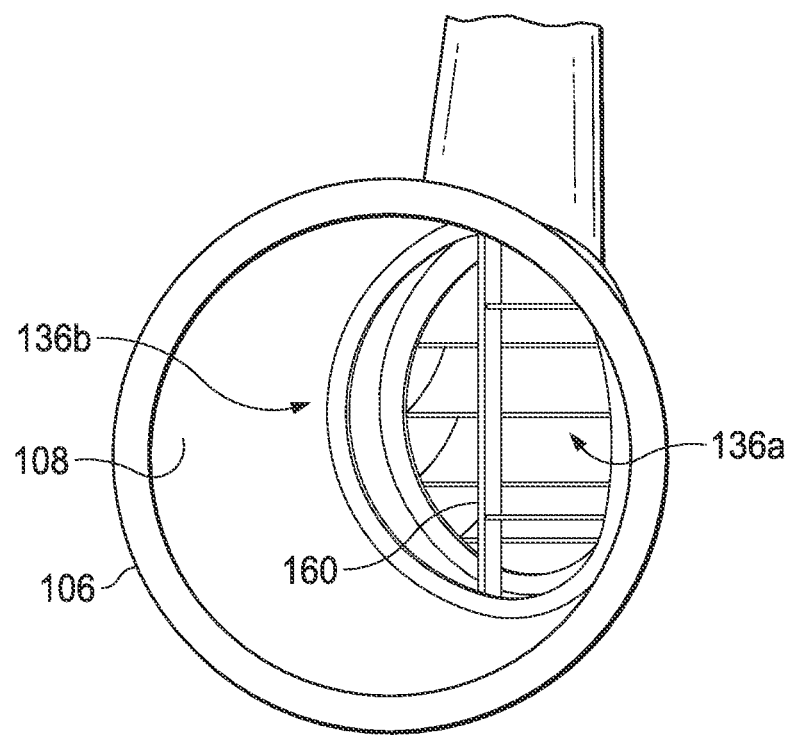
FIG. 8B is a cut-away end view illustrating a reverser vane assembly according to aspects of an exemplary anti-torque system in a forward-thrust position.
Figure 8C:
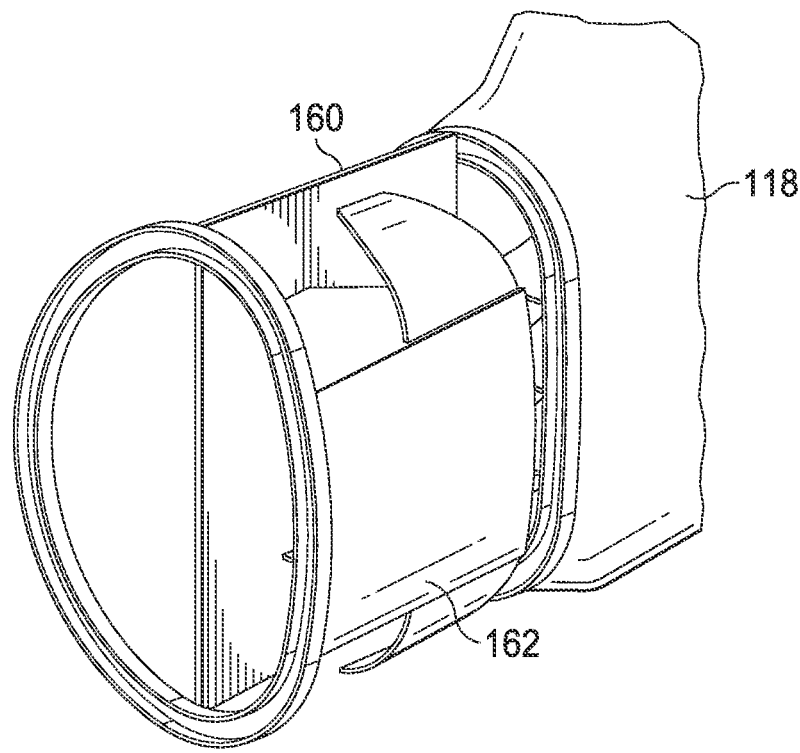
FIG. 8C is a cut-away perspective view illustrating a reverser vane assembly according aspects of an exemplary anti-torque system in a forward-thrust position.
Figure 8D:
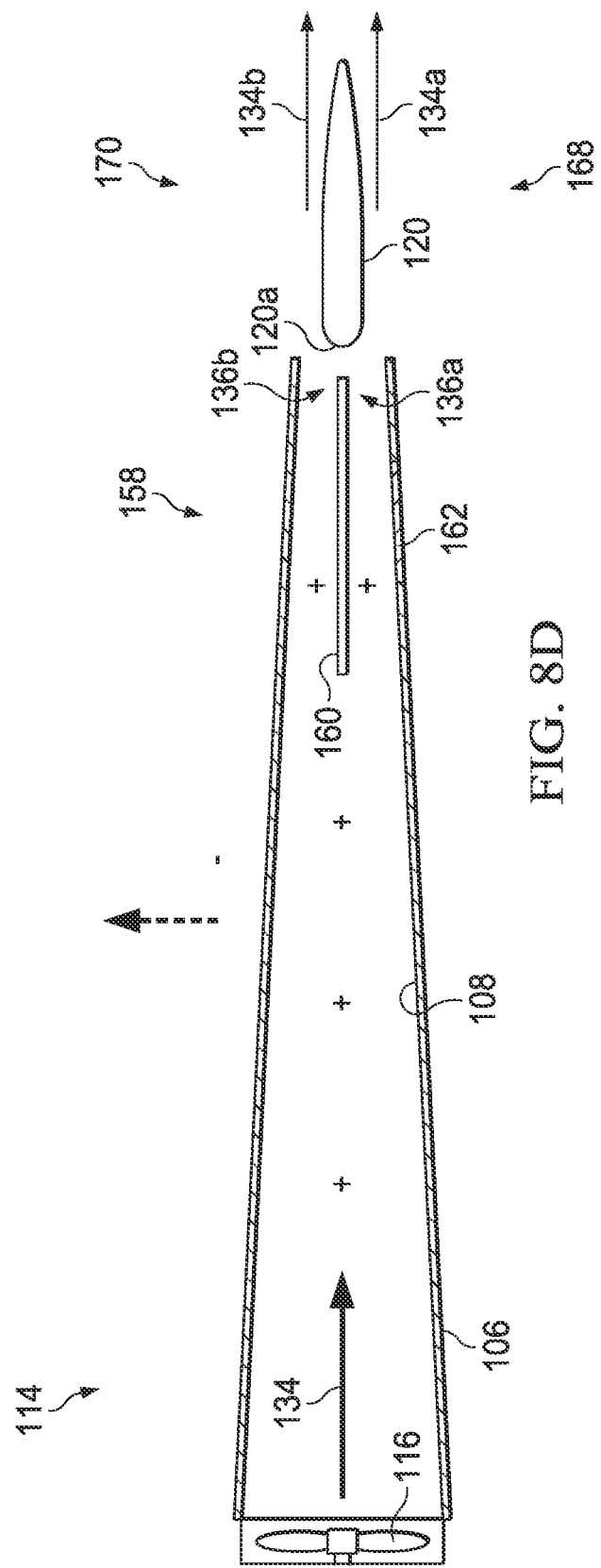
FIG. 8D is a schematic illustration of operation of an exemplary anti-torque system in a forward-thrust position.

In the reverse-thrust position, vane 162 blocks first outlet portion 136a and opens a reverse port 164 on first side 168 of tail boom 106 thereby directing first airflow stream 134a through reverse port 164 in a forward direction. Second outlet portion 136b remains open allowing second airflow stream 134b to be discharged on second side 170 of rudder 120. FIG. 7D illustrates low pressure ports 166 that may be positioned on the anti-torque side of tail boom 106 that may be opened to increase anti-torque force 150. Some embodiments do not include low-pressure ports 166.

Anti-torque system 114 during forward flight is described with reference in particular to FIGS. 8A-8D. In forward flight, the proportional speed activated vane 162 is closed blocking reverse port 164 and directing all airflow 134 through outlet 136. Airflow 134 is directedly symmetrically on rudder 120 with first airflow stream 134a directed on first side 168 of rudder 120 and second airflow stream 134b directed on second side 170 of rudder 120, thus not creating any yaw unless pilot activated through deflection of rudder 120.

As used herein, the terms "connect," "connection," "connected," "in connection with," and "connecting" be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified and includes what s specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotorcraft, comprising:
   a fuselage having a body and a tail boom;
   a main rotor located with the body;
   a vertical stabilizer at an aft end of the tail boom;
   a rudder coupled to a trailing edge of the vertical stabilizer;
   a channel inside of the fuselage extending from an inlet proximate a forward end of the tail boom to an outlet on the trailing edge of the vertical stabilizer, the outlet oriented to direct airflow from the channel onto the rudder; and
   a fan located inside of the channel aft of the inlet.

2. The rotorcraft of claim 1, wherein the tail boom does not comprise a tail rotor.

3. The rotorcraft of claim 1, wherein the tail boom comprises a generally D-shaped portion with a convex side opposite a generally vertical planar side.

4. The rotorcraft of claim 1, further comprising a prime mover located in the fuselage and coupled to the fan.

5. The rotorcraft of claim 1, further comprising an internal combustion engine located in the fuselage, the internal combustion engine coupled to the fan and to the main rotor; and
   the tail boom comprising a generally D-shaped portion with a convex side opposite a generally vertical planar side.

6. The rotorcraft of claim 1, further comprising an internal combustion engine coupled to the fan through a driveshaft, the internal combustion engine located forward of the inlet; and
   a heat exchanger positioned at the inlet.

7. The rotorcraft of claim 1, wherein the outlet extends vertically on the trailing edge of the vertical stabilizer.

8. The rotorcraft of claim 1, further comprising a diffuser located in the vertical stabilizer, the diffuser comprising two or more structures forming vertically separated passages proximate the outlet.

9. The rotorcraft of claim 1, further comprising an internal combustion engine located in the fuselage forward of the inlet, the internal combustion engine coupled to the fan and to the main rotor;
   a heat exchanger positioned proximate the inlet; and
   a diffuser located in the vertical stabilizer, the diffuser comprising two or more structures forming vertically separated passages proximate the outlet.

10. The rotorcraft of claim 1, further comprising:
an internal combustion engine located in the fuselage forward of the inlet, the internal combustion engine coupled to the fan and to the main rotor;
a wall located in the fuselage between the internal combustion engine and the fan;
a heat exchanger positioned proximate the inlet;
a zone between the wall, the fan, and the heat exchanger; and
an exhaust conduit extending from the internal combustion engine into the zone, the exhaust conduit operable to communicate exhaust from the internal combustion engine into the zone.

11. The rotorcraft of claim 10, further comprising a diffuser operable to vertically distribute the airflow through the outlet located on the trailing edge of the vertical stabilizer.

12. The rotorcraft of claim 1, further comprising:
a divider positioned vertically in an aft portion of the tail boom dividing the channel into generally symmetric first and second outlet portions; and
a vane operable between a forward-thrust position in which the vane permits the airflow to be directed onto the rudder through the first outlet portion and the second outlet portion and a reverse-thrust position in which the vane blocks the airflow through the first outlet portion onto the rudder opens a reverse port on the tail boom in communication with the first outlet portion.

13. The rotorcraft of claim 12, wherein the outlet extends vertically on the trailing edge of the vertical stabilizer.

14. The rotorcraft of claim 12, wherein the vertical stabilizer comprises two or more vertically separated structures forming separated passages proximate the outlet operable to vertically distribute the airflow through the outlet.

15. The rotorcraft of claim 12, further comprising an internal combustion engine located in the fuselage forward of the inlet, the internal combustion engine coupled to the fan and to the main rotor; and
a heat exchanger positioned proximate the inlet.

16. The rotorcraft of claim 15, further comprising a wall located in the fuselage between the internal combustion engine and the fan;
a zone between the wall, the fan, and the heat exchanger; and
an exhaust conduit extending from the internal combustion engine into the zone, the exhaust conduit operable to communicate exhaust from the internal combustion engine into the zone.

17. A rotorcraft, comprising:
a fuselage having a body and a tail boom;
a main rotor located with the body;
a vertical stabilizer at an aft end of the tail boom;
a rudder coupled to a trailing edge of the vertical stabilizer;
a channel inside of the fuselage extending from an inlet proximate a forward end of the tail boom to an outlet on the trailing edge of the vertical stabilizer, the outlet oriented to direct airflow from the channel onto the rudder;
a diffuser operable to vertically distribute the airflow through the outlet;
a fan located inside of the channel aft of the inlet;
a divider positioned vertically in tail boom dividing the channel into generally symmetric first and second outlet portions; and
a vane operable between a forward-thrust position in which the vane permits the airflow to be directed onto the rudder through the first outlet portion and the second outlet portion and a reverse-thrust position in which the vane blocks the airflow through the first outlet portion onto the rudder opens a reverse port on the tail boom in communication with the first outlet portion.

18. The rotorcraft of claim 17, further comprising:
an internal combustion engine located in the fuselage forward of the inlet, the internal combustion engine coupled to the fan and to the main rotor;
a wall located in the fuselage between the internal combustion engine and the fan;
a heat exchanger positioned proximate the inlet;
a zone between the wall, the fan, and the heat exchanger; and
an exhaust conduit extending from the internal combustion engine into the zone, the exhaust conduit operable to communicate exhaust from the internal combustion engine into the zone.

19. The rotorcraft of claim 18, wherein the tail boom includes a generally D-shaped portion with a convex side opposite a generally vertical planar side.

20. The rotorcraft of claim 17, wherein the tail boom includes a generally D-shaped portion with a convex side opposite a generally vertical planar side.

* * * * *

UNITED STATES PATENT AND TRADEMARK OFFICE
CERTIFICATE OF CORRECTION

PATENT NO. : 11,584,522 B2
APPLICATION NO. : 17/106514
DATED : February 21, 2023
INVENTOR(S) : Martin Landry It is certified that error appears in the above-identified patent and that said Letters Patent is hereby corrected as shown below:

In the Claims

Column 7, Claim 12, Lines 22-29    Replace "a vane operable between a forward-thrust position in which the vane permits the airflow to be directed onto the rudder through the first outlet portion and the second outlet portion and a reverse-thrust position in which the vane blocks the airflow through the first outlet portion onto the rudder opens a reverse port on the tail boom in communication with the first outlet portion." with --a vane operable between a forward-thrust position in which the vane permits the airflow to be directed onto the rudder through the first outlet portion and the second outlet portion and a reverse-thrust position in which the vane blocks the airflow through the first outlet portion onto the rudder and opens a reverse port on the tail boom in communication with the first outlet portion.--

Column 8, Claim 17, Lines 20-27    Replace "a vane operable between a forward-thrust position in which the vane permits the airflow to be directed onto the rudder through the first outlet portion and the second outlet portion and a reverse-thrust position in which the vane blocks the airflow through the first outlet portion onto the rudder opens a reverse port on the tail boom in communication with the first outlet portion." with --a vane operable between a forward-thrust position in which the vane permits the airflow to be directed onto the rudder through the first outlet portion and the second outlet portion and a reverse-thrust position in which the vane blocks the airflow through the first outlet portion onto the rudder and opens a Signed and Sealed this
Eighteenth Day of April, 2023

*Katherine Kelly Vidal*

Katherine Kelly Vidal
*Director of the United States Patent and Trademark Office* reverse port on the tail boom in communication with the first outlet portion.--